United States Patent [19]

Rochlitz

[11] 3,908,547

[45] Sept. 30, 1975

[54] HYDROPHILIZING SOLUTION FOR ELECTROPHOTOGRAPHIC IMAGES

[75] Inventor: Jurgen Rochlitz, Wiesbaden, Germany

[73] Assignee: Hoechst Aktiengesellschaft, Germany

[22] Filed: Mar. 16, 1972

[21] Appl. No.: 235,378

Related U.S. Application Data

[60] Continuation of Ser. No. 72,146, Sept. 14, 1970, abandoned, which is a division of Ser. No. 800,764, Feb. 19, 1969, abandoned.

[30] Foreign Application Priority Data

Feb. 22, 1968 Germany.............................. 1622360

[52] U.S. Cl............. 101/465; 101/451; 260/29.4 R; 427/17
[51] Int. Cl.²...................... B41N 3/08; C08L 61/24
[58] Field of Search........ 106/2, 14.5; 117/34, 35.6; 260/29.4 R; 96/1.8, 33; 101/451, 465, 466

[56] References Cited

UNITED STATES PATENTS

| | | | |
|---|---|---|---|
| 3,107,169 | 10/1963 | Bornorth................................. | 96/33 |
| 3,354,824 | 11/1967 | Griffith et al........................ | 101/451 |
| 3,513,000 | 5/1970 | Vrancken et al.................. | 106/14.5 |

*Primary Examiner*—Robert F. White
*Assistant Examiner*—James B. Lowe
*Attorney, Agent, or Firm*—James E. Bryan

[57] ABSTRACT

This invention relates to a process for hydrophilizing the non-image areas of an electrophotographically-produced printing master which comprises treating the master with a hydrophilizing solution which comprises water, at least one bivalent metal salt, at least one easily hydrolyzable metal salt, and a water-soluble urea-formaldehyde resin curable by a bivalent metal salt.

4 Claims, No Drawings

HYDROPHILIZING SOLUTION FOR ELECTROPHOTOGRAPHIC IMAGES

This is a continuation of application Ser. No. 72,146, filed Sept. 14, 1970, and now abandoned, which is a division of application Ser. No. 800,764, filed Feb. 19, 1969, and now abandoned.

This invention relates to a solution for hydrophilizing the image-free areas of an electrophotographic layer, which particularly also may be liquid-developed, in the production of planographic printing foils, which solution comprises aqueous solutions of bivalent metal salts, if desired a water-soluble solvent, and, if desired, additional known additives.

It is known that copies having images produced on electrophotographic zinc oxide layers can be converted into offset printing foils by means of aqueous solutions of polyacrylic acid, $K_4Fe(CN)_6$, or zinc acetate. It has been suggested to hydrophilize such copies by treating them with aqueous solutions of bivalent metal salts.

These known processes can be employed only with image layers which have been prepared by dry means, i.e., by treatment with a dry development powder. The aforementioned methods cannot be used when liquid-developed image layers are to be hydrophilized. The image areas of liquid-developed copies are covered with toner to a lesser extent than are the dry-developed ones so that the copies are hydrophilized without any differentiation and the printing ink does not adhere.

The present invention provides a hydrophilizing solution capable of hydrophilizing liquid-developed image layers with differentiation so that longer printing runs can be achieved than with the known processes.

The invention is based upon an aqueous solution of bivalent metal salts, if desired a water-soluble solvent, and, if desired, additional known additives. The solution also contains an easily hydrolyzable metal salt, particularly iron (III) chloride, and, if desired, a water-soluble resin which is curable with metal salts.

Suitable bivalent metal salts contained in the hydrophilizing solution according to the invention are, particularly, water-soluble acetates, nitrates, chlorides, and/or formiates of barium, cadmium, calcium, cobalt, copper, lead, iron, manganese, nickel, strontium, zinc, and the like. Especially suitable are $CuCl_2$, $CuBr_2$, $CuSO_4$, $Cu(CH_3CO_2)_2$, $CoCl_2$, $Co(NO_3)_2$, $NiSO_4$, $NiCl_2$, $MnSO_4$, $MnCl_2$, $Mn(CH_3CO_2)_2$ and $FeCl_2$. These salts generally are used in concentrations of about 1 to 10 per cent by weight, calculated on the weight of aqueous solution.

The solution also may contain a water-soluble organic solvent, such as ethyl alcohol, acetone, methyl glycol, i-propyl alcohol, dioxane, ethyl glycol, or dimethyl sulfoxide, which serves for softening the electrophotographic layer and for facilitating the action of the salts. Further, the hydrophilizing solution may contain, in known manner, film-forming substances, e.g. gum arabic, polyvinyl acetate polymer, e.g. "Mowilith" (Registered Trademark) of Farbwerke Hoechst AG, Germany, polyglycols, phenolformaldehyde resins, and the like.

Suitable water-soluble hydrolyzable metal salts which make the hydrophilizing solution utilizable for the treatment of liquid-developed layers, are, particularly, iron (III) chloride, aluminum chloride (cryst.), cerium (III) ammonium nitrate, cerium (IV) ammonium sulfate, cerium (III) nitrate, aluminum potassium sulfate, chromium (III) nitrate, iron (III) nitrate, bismuth nitrate, and cobalt (III) chloride.

These salts are used in quantities of about 10 to 150, preferably 25 to 50, per cent by weight, calculated on the weight of the bivalent metal salt.

According to another feature of the invention, it is particularly advantageous to add to the solution other water-soluble resins which are curable with the bivalent metal salts, such as, particularly, urea and/or melamine resins, and the like. The resin component may be present in a quantity of 5 to 25 per cent by weight, calculated on the weight of the total solution.

The hydrophilizing solution of the invention is particularly suitable for the treatment of images produced on zinc oxide layers, but it may be similarly employed for any other organic or inorganic photoconducting layers applied to any supports, such as paper, plastic films, or metal foils.

In addition to its advantages for hydrophilizing liquid-developed images, the solution also is very suitable for hydrophilizing dry-developed electrophotographic copies.

Particularly in the case of liquid-developed electrophotographic images, the solution of the present invention leads to a very good differentiation of the image areas from the non-image areas, so that good adhesion of the printing ink and long printing runs are obtained. It is thus possible to obtain runs of 50 to 1,000 prints with a zinc oxide layer on a paper support without the zinc oxide binder layer being damaged in the offset machine by the roller pressure or adhesive action of the printing ink. Such long printing runs could not be achieved according to the hitherto known processes.

The present invention also relates to a process for hydrophilizing planographic printing formes with the use of the solutions of the invention, in which the fountain solution in the offset machine consists entirely or partially of these solutions. The content of the hydrophilizing solution in the fountain solution advantageously is about 25 to 100 per cent by weight.

Using this process, after-hydrophilizing during the printing procedure is not necessary so that a particularly good printing quality is obtained. The preferable solvent used in this case is acetone or methyl glycol.

If desired, further improvements are obtained by adding additional water-soluble polymer substances, e.g. water-soluble dextranes or cellulose ether.

The invention will be further illustrated by reference to the following specific examples:

An image produced on an electrophotographic zinc oxide paper was liquid-developed by treating it with a commercial liquid toner (e.g. a carbon black/fusible resin dispersion in a high-boiling (about 185° to 210°C.) hydrocarbon mixture) and the copy was then clamped into an offset printing machine and treated by means of a sponge with a hydrophilizing solution of the composition indicated below. The composition of the fountain solution and the length of printing run obtained are listed in the following table.

TABLE I

| | Hydrophilizing solution | Composition of the fountain solution | Printing Run (No. of copies) |
|---|---|---|---|
| (1) | 6 g $CuCl_2$; 1.5 g $FeCl_3$; 20 ml. of a 60% butanol/xylene solution of a urea formaldehyde resin (Resamin 403 F of Chemische Werke Albert, Wiesbaden-Biebrich Germany); 20 ml. $H_2O$, and 35 ml. dimethyl sulfoxide. | Mixture of 300 ml. water, 700 ml. glycerol and 1 g polyvinyl phosphonic acid. | about 300 |
| (2) | 6 g $CuCl_2$; 1.5 g $FeCl_3$; 20 ml. Resamin 403 F (60%); 20 ml. $H_2O$; and 35 ml. methyl glycol. | as in (1) | about 300 |
| (3) | 6 g $CuCl_2$; 1 g $FeCl_3$; 20 ml. Resamin 403 F (60%); 20 ml. $H_2O$; and 35 ml. acetone. | as in (1) | about 500 |
| (4) | 6 g $CuCl_2$; 1.5 g $FeCl_3$; 20 ml. Resamin 403 F; 20 ml. $H_2O$; and 35 ml. acetone. | 300 ml. fountain solution (as in (1)); 100 ml. hydrophilizing solution. | about 600 |
| (5) | 6 g $CuCl_2$; 1.5 g $FeCl_3$; 20 ml. Resamin 403 F; 20 ml. $H_2O$; and 35 ml. acetone. | 250 ml. fountain solution (as in (1)); 250 ml. hydrophilizing solution (as stated). | about 700 |
| (6) | 6 g $CuCl_2$; 3 g $FeCl_3$; 40 ml. $H_2O$; and 35 ml. acetone. | 350 ml. $H_2O$; 50 ml. Resamin 403 F; and 20 g $CoCl_2$. | about 300 |
| (7) | 20 ml. Resamin 403 F; 20 ml. $H_2O$; and 35 ml. acetone. | 32 g $CuCl_2$; 8 g $FeCl_3$; and 400 ml. $H_2O$. | about 400 |
| (8) | 6 g $CuCl_2$; 6 g $FeCl_3$; 20 ml. Resamin 403 F; 20 ml. $H_2O$; and 35 ml. methyl glycol. | 20 g $CuCl_2$; 15 g $FeCl_3$; 35 ml. Resamin 403 F; 117 ml. methyl glycol; and 248 ml. $H_2O$. | about 500 |
| (9) | 6 g $CuCl_2$; 4.5 g $FeCl_3$; 40 ml. $H_2O$; and 35 ml. acetone. | 30 ml. Resamin 403 F; 20 g. $CoCl_2$; and 270 ml. $H_2O$. | about 500 |
| (10) | 6 g $CuCl_2$; 1 g $AlCl_3$; (cryst.) 20 ml. $H_2O$; 35 ml. acetone; and 20 ml. Resamin 403 F. | as in (1) | about 500 |

As can be seen particularly from Examples 4 and 5, the addition of hydrophilizing solution to the fountain solution considerably increases the printing run.

It will be obvious to those skilled in the art that many modifications may be made within the scope of the present invention without departing from the spirit thereof, and the invention includes all such modifications.

What is claimed is:

1. A process for hydrophilizing the non-image areas of an electrophotographically-produced printing master which comprises treating the master with a hydrophilizing solution which comprises
   a. water,
   b. at least one bivalent metal salt selected from the group consisting of water-soluble acetates, nitrates, chlorides, and formates of copper, cobalt, nickel, manganese and iron, said bivalent metal salt being used in a concentration in the range of about 1 to 10 per cent by weight, calculated on the weight of total aqueous solution,
   c. at least one easily hydrolyzable metal salt selected from the group consisting of iron (III) chloride, aluminum chloride (cryst.), cerium (III) ammonium nitrate, cerium (IV) ammonium sulfate, cerium (III) nitrate, aluminum potassium sulfate, chromium (III) nitrate, iron (III) nitrate, bismuth nitrate and cobalt (III) chloride, said easily hydrolyzable metal salt being used in a quantity in the range of about 10 to 150 per cent by weight, calculated on the weight of the bivalent metal salt, and
   d. a water-soluble urea-formaldehyde resin curable by a bivalent metal salt, said resin being present in a quantity in the range of about 5 to 25 per cent by weight, calculated on the weight of the total aqueous solution.

2. A process according to claim 1 in which the solution includes a plurality of bivalent metal salts.

3. A process according to claim 1 in which the solution contains a water-soluble solvent.

4. A process according to claim 1 in which the solution constitutes at least a part of a fountain solution.

* * * * *